No. 662,443. Patented Nov. 27, 1900.
J. N. JOHNSON.
VEHICLE WHEEL.
(Application filed Mar. 17, 1900.)
(No Model.)
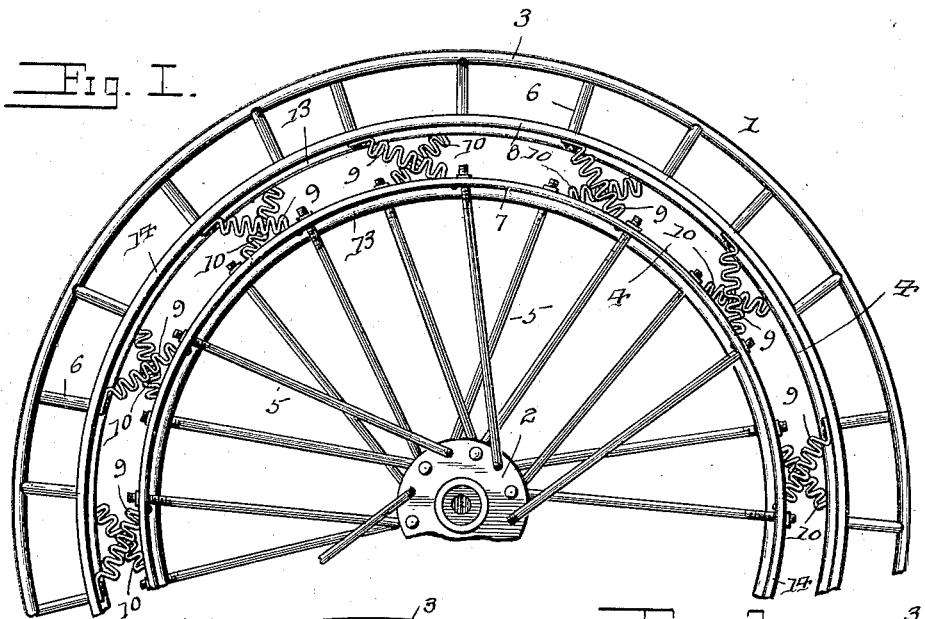
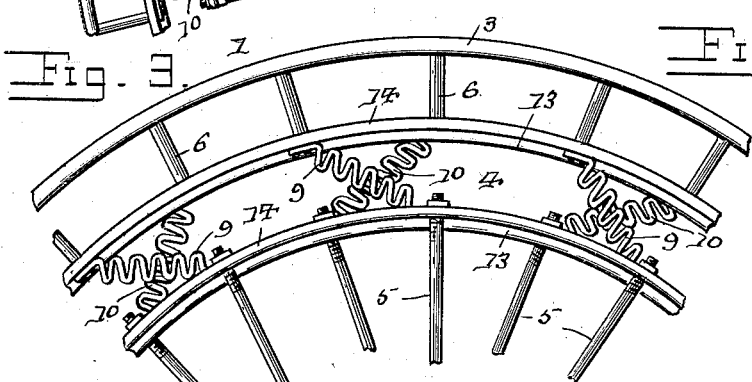
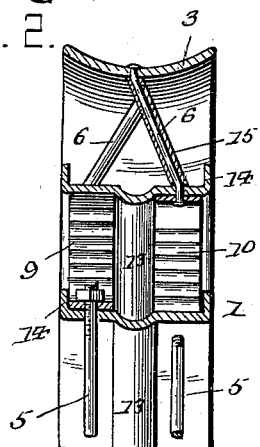
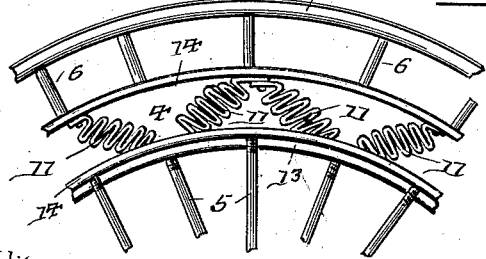
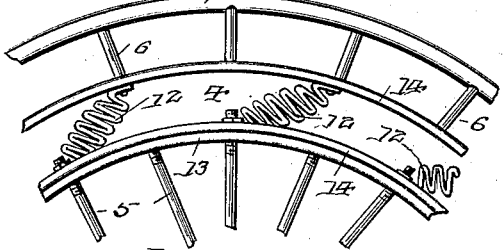
Witnesses
F. E. Alden
H. J. Riley
J. N. Johnson, Inventor
By his Attorneys,

UNITED STATES PATENT OFFICE.

JAMES NAPOLEON JOHNSON, OF HATTIESBURG, MISSISSIPPI, ASSIGNOR OF ONE-FOURTH TO JOHN FRANKLIN BENNETT, OF SAME PLACE.

VEHICLE-WHEEL.

SPECIFICATION forming part of Letters Patent No. 662,443, dated November 27, 1900.

Application filed March 17, 1900. Serial No. 9,051. (No model.)

*To all whom it may concern:*

Be it known that I, JAMES NAPOLEON JOHNSON, a citizen of the United States, residing at Hattiesburg, in the county of Perry and State of Mississippi, have invented a new and useful Vehicle-Wheel, of which the following is a specification.

The invention relates to improvements in spring-wheels.

The object of the present invention is to improve the construction of spring-wheels for vehicles, bicycles, and other conveyances and machines, more especially the wheel shown and described in Patent No. 607,378, granted to me July 12, 1898, and to increase the strength and durability of such wheels, and to arrange the springs in a position which will be most effective in resisting the strain incident to starting, propelling, and stopping a vehicle or machine.

The invention consists in the construction and novel combination and arrangement of parts hereinafter fully described, illustrated in the accompanying drawings, and pointed out in the claims hereto appended.

In the drawings, Figure 1 is a side elevation of the upper portion of a spring-wheel constructed in accordance with this invention. Fig. 2 is a transverse sectional view. Fig. 3 is an enlarged detail view of a portion of the wheel. Figs. 4 and 5 are detail views, showing different arrangements of the cushioning-springs.

Like numerals of reference designate corresponding parts in all the figures of the drawings.

1 designates a spring-wheel provided between its hub 2 and its rim 3 with an elastic or spring girdle 4, which is connected, respectively, with the hub 2 and the rim 3 by inner and outer spokes 5 and 6. The resilient or elastic girdle is composed of inner and outer concentric rings or bands 7 and 8 and springs 9 and 10, interposed between the inner and outer concentric rings or bands 7 and 8 and disposed at an angle to the radius of the wheel, whereby they are adapted to resist longitudinally the strain on the wheel incident to starting and stopping a vehicle or machine or any force tending to cause the inner portion of the wheel to rotate at a different rate of speed from the outer portion. Such strain will operate to expand and contract the springs longitudinally and will be resisted by them to their greatest advantage without impairing their efficiency and without twisting them laterally or injuring the material of which they are constructed. Each spring, which is constructed of a strip of flat spring metal, consists of a series of transversely-disposed loops substantially U-shaped and connected together at opposite sides of the spring, and the terminals of the latter are extended in opposite directions and are secured to the opposed faces of the inner and outer concentric rings or bands at points out of radial alinement. The girdle may be provided with pairs of springs arranged as illustrated in Figs. 1 to 3 of the accompanying drawings, the members of each pair being disposed in opposite directions, whereby they are adapted to cushion the strain on the wheel equally in starting and stopping a vehicle or machine. In Fig. 4 of the accompanying drawings the same result is accomplished by means of oppositely-inclined springs 11, which extend substantially across the inner and outer concentric rings or bands and which are alternately disposed in opposite directions. The springs, however, may, as illustrated at 12 in Fig. 5 of the accompanying drawings, be disposed in the same general direction.

The inner and outer concentric rings or bands are constructed alike, and each is provided with a central stiffening-rib 13 and side flanges 14. The rib which is formed by grooving the metal is extended inward toward the hub of the wheel, and it has been found that this arrangement will collect less dust and dirt than when the rib is extended toward the rim. The side flanges which are arranged parallel with each other and with the plane of the rib are extended outward toward the rim of the wheel, and they not only serve to stiffen the concentric rings or bands, but they also present smooth side faces, and those of the inner ring or band form seats for supporting the adjacent ends of the springs and prevent the latter from twisting.

The spring may, as illustrated in Figs. 4 and 5 of the accompanying drawings, be tapered from their centers to their ends by gradually decreasing the width of the transverse loops, and the outer spokes 6, which are staggered, as illustrated in Fig. 2 of the accompanying drawings, are provided with sleeves 15, interposed between the rim and the outer ring or band of the elastic girdle. These sleeves greatly stiffen the outer portion of the wheel and increase the strength and durability of the latter. The rim may be provided with any suitable form of tire, and the inner and outer spokes may be advantageously employed for securing the springs to the inner and outer rings of bands of the girdle.

It will be seen that the spring-wheel, which is adapted for all kinds of vehicles and analogous conveyances and machines, possesses great strength, durability, and elasticity, and that by arranging the springs at an angle to the radii of the wheel they are compressed and distended longitudinally by the strains to which the wheel is subjected in starting and stopping a vehicle or machine.

What is claimed is—

1. In a wheel of the class described, the combination with a hub, a rim, and inner and outer spokes, of an elastic girdle connected with the spokes and composed of concentric rings or bands, and the interposed springs disposed at an angle to the radius of the wheel, and having their ends located opposite different points of the periphery of the wheel and forming the sole connection between the rings or bands and adapted to rotate partially in reverse directions, said springs being also capable of being compressed and distended longitudinally by the strains to which the wheel is subjected in starting, propelling and stopping a vehicle or machine, substantially as described.

2. In a wheel of the class described, the combination with a hub, a rim, and inner and outer spokes, of a girdle composed of concentric rings or bands, and interposed springs forming the sole connection between the rings or bands and provided with a longitudinal series of transverse loops and arranged at an angle to the radius of the wheel with their ends opposite different points of the periphery of the latter and adapted to be distended and compressed longitudinally, substantially as and for the purpose described.

3. In a wheel of the class described, the combination with a hub, a rim, and inner and outer spokes, of a girdle composed of concentric rings or bands, and the oppositely-disposed interposed springs forming the sole connection between the rings or bands and arranged at an angle to the radius of the wheel with their ends opposite different points of the periphery of the latter and adapted to be compressed and distended longitudinally, substantially as and for the purpose described.

4. In a wheel of the class described, the combination with a hub, a rim, and inner and outer spokes, of a girdle composed of concentric rings or bands, and the interposed springs forming the sole connection between the rings or bands and arranged in pairs, the members of each pair being disposed in opposite directions and at an angle to the radius of the wheel, with their ends opposite different points of the periphery of the latter, substantially as and for the purpose described.

5. In a wheel of the class described, the combination of a ring or band having a central stiffening-rib and provided at opposite sides thereof with smooth portions, said ring or band being also provided with side flanges, and the springs secured to the smooth portions and supported by the side flanges, substantially as described.

6. A wheel of the class described comprising a hub, a rim, inner and outer spokes, and a girdle composed of inner and outer concentric rings or bands each provided with a central stiffening-rib and having outwardly-extending flanges forming smooth side faces, and springs interposed between the rings or bands and supported at their inner ends by the side flanges of the inner ring or band, substantially as described.

In testimony that I claim the foregoing as my own I have hereto affixed my signature in the presence of two witnesses.

JAMES NAPOLEON JOHNSON.

Witnesses:
J. F. BENNETT,
T. J. MIXON.